R. B. WASSON.
METHOD OF MAKING METAL PACKING RINGS.
APPLICATION FILED MAR. 8, 1911.

1,009,000.

Patented Nov. 14, 1911.

2 SHEETS—SHEET 1.

Attest:
G. Robert Thomas
D. Harold Bush

Inventor:
Robert B. Wasson
by Wm. F. Bissing Atty

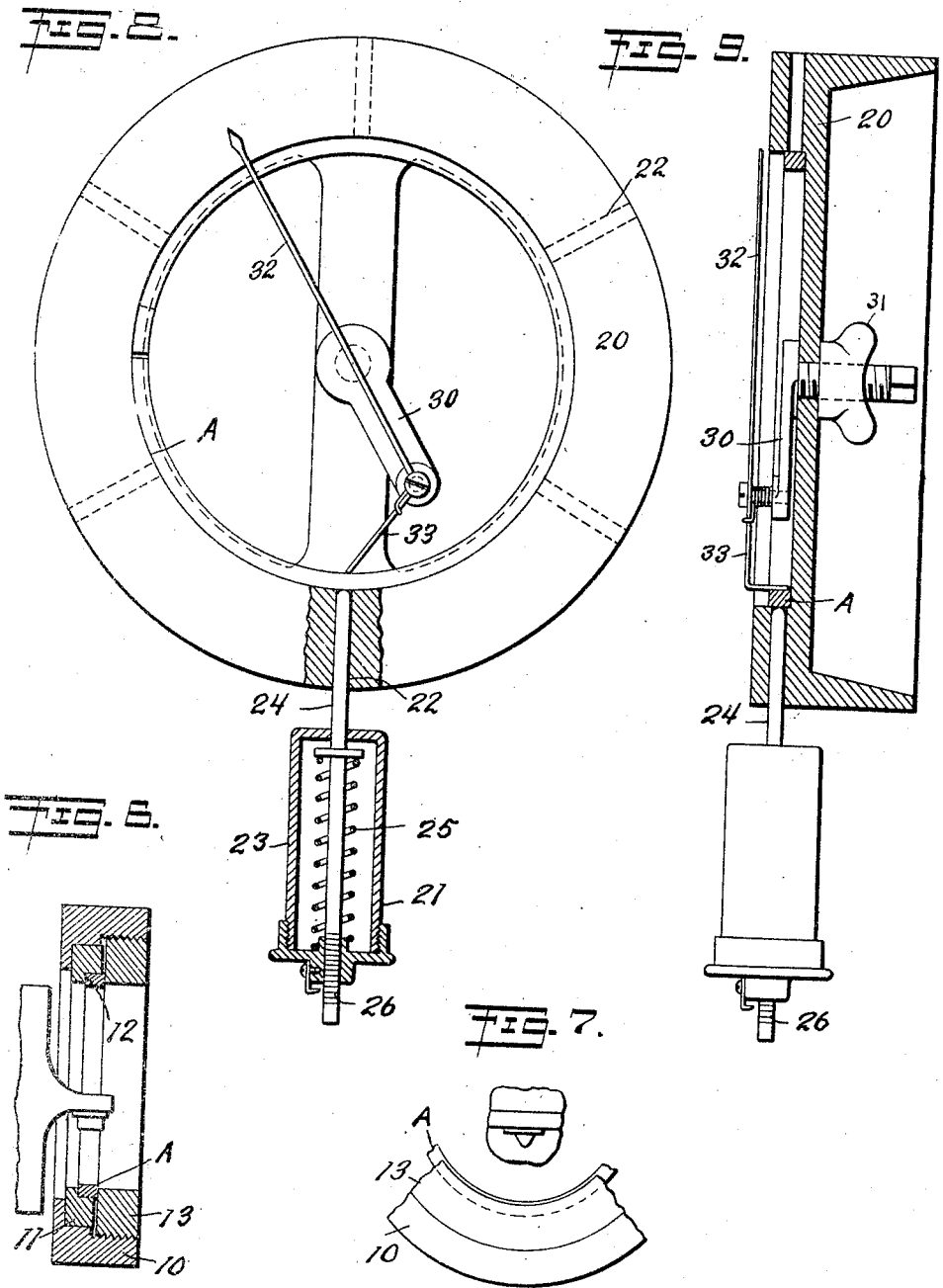

UNITED STATES PATENT OFFICE.

ROBERT B. WASSON, OF CRANFORD, NEW JERSEY.

METHOD OF MAKING METAL PACKING-RINGS.

1,009,000.  Specification of Letters Patent.  Patented Nov. 14, 1911.

Application filed March 8, 1911. Serial No. 613,005.

*To all whom it may concern:*

Be it known that I, ROBERT B. WASSON, a citizen of the United States, residing at Cranford, in the county of Union, State of New Jersey, have invented certain new and useful Improvements in Methods of Making Metal Packing-Rings, of which the following is a specification.

This invention relates to methods of making metal packing rings. The packing rings made by this method are either in the nature of piston rings, which exert an outward radial pressure, or stuffing box rings, which exert an inward radial pressure. The rings are of that kind in which the radial pressure is due to the resiliency of the metal of the ring, and not to external springs.

Among the objects of the present invention are to provide a packing ring that will form as nearly as possible an absolutely tight joint both with the part carrying it and with the part with which it has slidable contact, to render the radial pressure of the ring uniform at all points circumferentially thereof, to minimize the amount of clearance or space between the ring and the walls of its retaining groove when in working condition, so as to minimize the accumulation of oil, etc., to secure approximately the minimum equal radial pressure that will produce a gas tight joint, thus reducing wear and friction and consequent loss of power, to secure an equal distribution of weight throughout the annulus so as to avoid the tendency of a plurality of rings under working conditions to localize or aline their slots, and to enable the ring to be produced in an economical manner.

With these and other ends in view, the invention may be said to consist in the method hereinafter described and more particularly pointed out in the claims.

Figure 1:
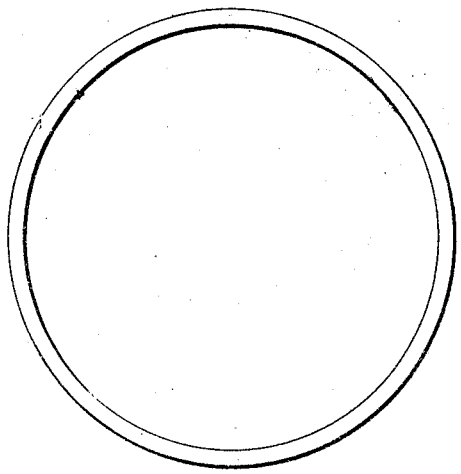
Figure 3:
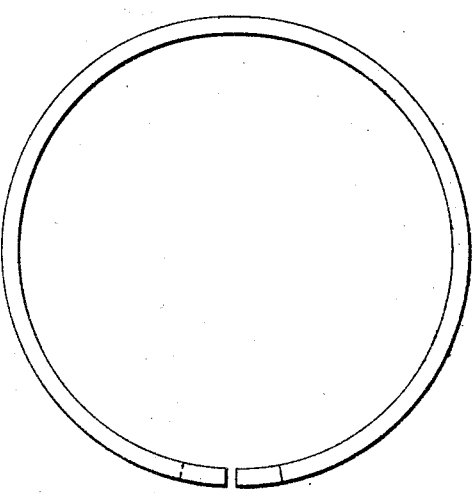
Figure 2:
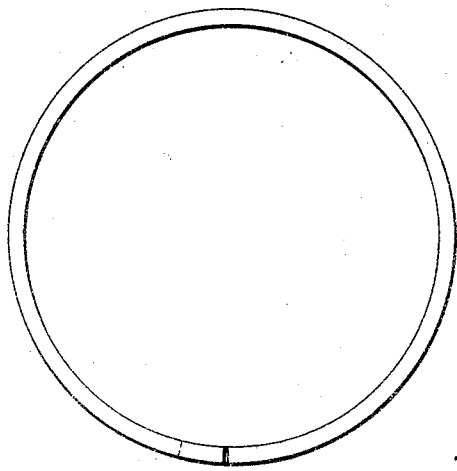
Figure 4:
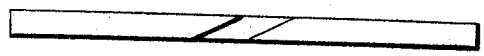
Figure 5:
Figure 10:
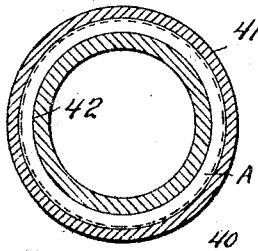
Figure 11:
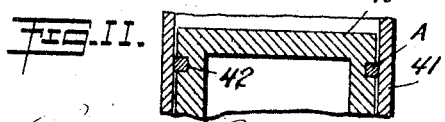

In the accompanying drawings illustrating the invention: Figure 1 is a plan view of the blank before cutting; Fig. 2 is a similar view of the blank after cutting; Fig. 3 is a plan view of the piston ring after having been hammered so as to cause the ends to separate; Fig. 4 is a side view of Fig. 3; Fig. 5 is a panoramic view of a portion of the inner surface of the piston ring, showing semi-diagrammatically the result of the hammering; Fig. 6 is a sectional view showing the ring held in position to be hammered, and the hammer in position to deliver the blow; Fig. 7 is a front view of the lower part of Fig. 6; Fig. 8 is a plan view of the ring and the holder in which it is held while being gaged, and showing also in longitudinal section a suitable instrument for gaging the tension of the ring; Fig. 9 is a sectional side elevation of the part shown in Fig. 8; and Figs. 10 and 11 are sectional views showing the completed piston ring seated in a groove in a piston and exerting circumferentially-uniform radial spring pressure on the confining wall of the cylinder.

In making a piston ring in accordance with my invention, I may, and preferably do, first produce an annulus of cast iron or other suitable metal which is of the same cross-section throughout, and which is circular both inside and out. Furthermore, this blank may be, and preferably is, of substantially the same external diameter as the bore of the cylinder and of substantially the same internal diameter as the bottom of the groove in the piston in which it is to be seated. The order of the subsequent steps may be varied. In the particular form of the invention here described, I now cut or split the annulus, preferably at one point and preferably with a diagonal cut. The annulus is preferably so cut that a minimum amount of metal is removed, that is, only so much is removed as is necessary to allow for thermal expansion and contraction while in use, say twenty thousandths of an inch. I now proceed to a most important step, which consists in mechanically and permanently distorting the structure of the inside surface portion of the metal ring. This operation results in spreading the annulus and increasing all its diameters, so as to separate its ends, so that, in order to introduce the ring in position on the piston inside the cylinder, it will be necessary to compress the ring back to its normal or original circular proportions; the ring will then exert a radial outward pressure that is due to the permanent distortion of the structure of the metal at the inner side of the ring. In other words, the permanent internal distortion of the structure of the superficial portion of the metal produces an external distortion of the annulus as a whole in the nature of an expansion or opening; so that the compression of the ring in the cylinder takes away this external distortion of form and acts in opposition to the permanent internal distortion, thereby occasioning the outward spring pressure. The distortion of the inner superficial region of the ring is preferably accomplished by hammering in the cold, and is preferably in the nature of a superficial compacting or compression of the structure of the metal along the inner circumference so as to produce a kind of compression spring action by the circumferential compacting of the particles of metal. The hammering operation has the effect of rendering the material more resilient. The operation is so conducted that the degree of distortion is varied circumferentially in a predetermined manner. Thus, the distortion is greatest at the central portion of the ring, opposite the cut, and thence diminishes in both directions to the two ends, where it is minimum. The energy of the blows used in hammering does not decrease uniformly from the middle or uncut to the cut portion of the ring. It decreases at first slowly and then very rapidly and then again more slowly. The superficial distortion is symmetrical or substantially so for both halves of the ring. By means of this graduated distortion of the inner superficial region of the ring I am enabled to secure an equal outward radial pressure at all points circumferentially of the ring. The hammering or distorting operation is so conducted as to leave the radial thickness of the annulus to all intents and purposes unchanged; so that the annulus, as before hammering is of uniform cross-section throughout. When the ring so made is placed in its groove in a piston and compressed by the confining wall of the cylinder, it fills its groove substantially all the way to the bottom, uniformly all the way around, and preferably it is of the same internal and external diameter as before hammering, and has the same very slight space between its ends. This space is just sufficient to allow for the differential thermal expansion of the ring and piston, and is substantially closed when the parts heat up to the usual running temperature. The insertion of the ring in the cylinder compresses the open ring from all radial directions, shortening all of the diameters or axes of the open ring, so that the ring exerts outward radial pressure in all directions, at the region of the split as well as elsewhere.

Before the ring is put into use I prefer to grind it on the outer periphery and on the two sides, just sufficiently to insure a smooth joint. Preferably, one or more rings are first confined in a circular gage or holder of an internal diameter equal to, or substantially equal to, the internal diameter of the cylinder which the rings are to fit. The rings are then held in this circular form by lateral clamping means, after which the gage is removed and the grinding performed while the ring or rings are so clamped. The grinding may be done before the ring is cut or split.

In making a stuffing box ring, I start with a blank which may be of cast iron such as I have already described. I now cut as before, removing a minimum amount of metal. The hammering is then performed on the outside of the ring, instead of the inside, the operation being otherwise the same. This hammering operation tends to make the ring contract with its ends overlapped, so that when the ring is seated in its groove in a stuffing box or the like it exerts a uniform radial pressure inward on the shaft. In making a stuffing box ring, I may remove a very little more metal in the cutting operation than I prefer to do when making a piston ring, or else I may make the blank of slightly smaller diameter internally than the shaft or rod with which the ring is to make a tight, sliding joint; so as to insure that the abutting of the ends of the ring due to thermal expansion of the metal will not put an end to the inward pressure on the shaft. The grinding of the stuffing box ring to produce a smooth joint is performed on the inner surface and the two sides.

I prefer to perform the hammering operation with a hammer or striker having a narrow striking face as long as or longer than the width of the inner or outer face of the annulus. Preferably, the side faces of the striker converge, and the striking face is slightly curved transversely. One form of such a striker is shown in Figs. 6 and 7.

In operation the striking face of the hammer is disposed parallel to the width of the inner or outer surface of the annulus being worked on. I may so distribute the blows of this hammer that they overlap, producing a substantially continuous compacting along the length of the surface of the annulus; but I prefer to space the blows slightly, so that the superficial portion of the annulus will be condensed in a series of parallel strips or lines. This distortion of the structure of the metal may have a visible effect in the nature of a slight ribbing or banding of the surface, as shown semi-diagrammatically in Fig. 5. This ribbing as a surface configuration is, however, extremely slight, there being preferably no appreciable or material distance between the high and low portions of the ribbing. The effect of the distortion produced in this manner, and also where the transverse lines of condensation are caused to overlap, is confined largely or almost entirely to a circumferential direction; that is to say the effect of the blows on the metal may be said to comprise a radial component and a lateral component, and by my method I confine the lateral component to a circular or circumferential direction. In this way, the compacting of the metal is caused to yield maximum results in the way of radial expansion of the ring when the latter is confined in use. Thus the hammering need never be so heavy as to produce appreciable alteration of the cross-section of the ring.

While the hammering is being performed, I prefer to clamp or hold the two sides of the ring in such a way as not to interfere with the hammering operation and to afford a solid support for the circumference that is not being hammered. A suitable device for piston rings is shown in Fig. 6, wherein 10 is a metal holder, sufficiently heavy for the purpose, having an internal circular seat 11 (which may be replaceable by seats of various sizes if desired) for the periphery of the ring A, 12 is a fixed side clamping face on the seat 11 and 13 is a removable retaining ring, desirably threaded into the holder 10, and affording a complementary side clamping face. Thus, the outer and major portions of the two sides of the piston ring are clamped and the periphery is afforded solid support during the hammering. The side clamping of the ring contributes to the minimizing of the sidewise spreading of the metal under hammering.

From time to time I may, and preferably do, gage the result of the hammering, and proceed accordingly. This testing may be effected in a variety of ways. For purposes of illustration I have shown in Figs. 8 and 9, a holder 20 for a piston ring, having an internal circular seat of the same diameter as the cylinder bore which the ring A is to fit. The ring is slipped into this holder, and a pressure-indicating instrument such as indicated by the numeral 21 is pressed against the periphery of the portion or portions of the ring to be tested. The holder 20 may be provided with any suitable number of radial openings 22, through which the instrument 21 may be inserted against the periphery of the piston ring. The pressure-indicating instrument may be of any suitable nature. The device shown is of known construction, consisting of a barrel 23 through which slides a plunger 24 and in which is contained a spring 25 that opposes the rearward movement of the plunger. The plunger may bear pound or other graduations 26, to indicate the pressure at which the portion of the ring pressed upon yields from its seat in the holder 20. This is, of course, the same as the outward radial pressure exerted by this portion of the piston ring. In order that the operator may know when the piston ring first begins to yield, any suitable form of multiplying index or other indicator may be employed. For purposes of illustration, I have shown a bracket 30 rotatably mounted on the holder 20, normally locked by a nut 31 and carrying a pivoted pointer 32 the short arm 33 of which in any position of the bracket 30 bears against the inner surface of the piston ring. The ring is tested during hammering, until an equal pressure is indicated at all points. When the gage indicates a uniform pressure all the way around the ring, that pressure being the minimum that will preserve a gas-tight joint, say five pounds, then it is known that the hammering is being performed correctly. By means of this gaging step I may perform the hammering of the packing ring entirely by hand and in an empirical manner. Or I may perform the hammering by a suitable machine, automatically varying the blows by cam means designed according to the particular size of ring and the particular metal employed. But even if the hammering be conducted in this manner, the gaging step is useful since it enables variation in the metal of the same ring or different rings to be detected and compensated for by harder or softer hammering as the case may be. In fact one of the features of my invention is that I am enabled to insure uniform radial ring pressure by compensating for all variations in the metal of the ring. By means of the gaging operation I can also adjust the machine accurately until it turns out rings capable of exerting the desired uniform pressure.

A packing ring made according to my invention is of equal cross-section throughout. The feature of uniform cross-section is of primary importance, since it insures that the ring will not only form a tight joint with the cylinder wall (in case of a piston ring), but also with the piston that carries it, since the groove in the piston is accurately fitted and filled all the way around. Minimum clearance or space between the ring and the bottom of its groove, produces a gas-tight joint. The same is true, of course, with a stuffing box ring, the carrier there being the inclosing part.

Packing rings made according to my invention have their weight equally distributed, so that there is no tendency of two or more rings in a piston or stuffing box to work to a position with their slots or cuts in series. The ring in use affords a uniform wearing surface. One of the great features of the ring is that it exerts equal radial pressure at all points circumferentially. Moreover, by my method this pressure may be the minimum that will maintain a gas-tight joint. I thus reduce wear and power loss, which are increased if the pressure is unnecessarily high at any or all points.

In Figs. 10 and 11 I have shown a piston ring A mounted in a customary peripheral groove 42 in a piston 40 and exerting uniform outward radial pressure against the wall of the confining cylinder 41.

I claim—

1. The method of making metal packing rings, which consists in producing an annular blank of substantially uniform cross-section, splitting the annulus, and permanently distorting one of the circular sides of the annulus by densifying the metal superficially and in a varying degree, ranging from maximum at the point opposite the split to minimum at the ends so as to cause the ring to exert a circumferentially-uniform radial spring pressure under working conditions.

2. The method of making metal packing rings, which consists in producing an annular blank of substantially uniform cross-section, splitting the annulus with slight removal of metal, and compacting by hammering one of the circular sides of the annulus with blows varying in intensity from maximum at the point opposite the split to minimum at the ends so as to cause the ring to exert a circumferentially-uniform radial spring pressure under working conditions.

3. The method of making metal packing rings, which consists in compacting by hammering one of the circular sides of an annulus substantially without varying the cross-section of the annulus and with blows so varied in force circumferentially of the annulus as to cause the ring to exert a circumferentially-uniform radial spring pressure under working conditions.

4. The method of making metal packing rings, which consists in hammering one of the circular surfaces of an annulus of uniform cross-section with blows varying in intensity from maximum at a central point toward minimum in both directions from such central point, substantially without altering the cross-section of the annulus and so as to cause the ring to exert a circumferentially-uniform radial spring pressure under working conditions.

5. The method of making metal packing rings, which consists in densifying one of the circular sides of an annulus in such manner as to confine the lateral effect of the densification to a circumferential direction, and in degree varying circumferentially so as to give rise to circumferentially-uniform radial spring pressure under working conditions of the ring.

6. The method of making metal packing rings, which consists in densifying one of the circular sides of an annulus of uniform cross-section substantially without altering the cross-section of the annulus and in such manner as to confine the lateral effect of the densification to a circumferential direction, and in degree varying circumferentially so as to give rise to circumferentially-uniform radial spring pressure under working conditions of the ring.

7. The method of making metal packing rings, which consists in densifying one of the curved sides of an annulus by blows varying in intensity from maximum at a central point toward minimum in both directions therefrom, in such manner as substantially not to alter the cross-section of the annulus and to confine the lateral effect of the densification to a circular direction.

8. The method of making metal packing rings, consisting in affording solid circular support to one of the curved sides of an annulus, and hammering the other curved side of the annulus so as to alter the diameter of the annulus substantially without altering the cross-section and with blows so varied in intensity circumferentially of the ring as to produce a permanent circumferentially-varied distortion of the structure of the metal at the side hammered of a character to cause the ring to exert a circumferentially-uniform radial spring pressure under working conditions.

9. The method of making metal packing rings, consisting in affording solid support to one of the circumferences of the annulus and rigidly clamping the sides, and hammering the other circumference of the annulus so as to alter the diameter of the annulus substantially without altering the cross-section and with blows so varied in intensity circumferentially of the ring as to produce a permanent circumferentially-varied distortion of the structure of the metal at the side hammered of a character to cause the ring to exert a circumferentially-uniform radial spring pressure under working conditions.

10. The method of making metal packing rings, which consists in hammering one of the curved sides of an annulus so as to alter the diameter of the annulus substantially without altering the cross-section and with blows so varied circumferentially of the ring as to produce a permanent circumferentially-varied distortion of the structure of the metal at the side hammered of a character to cause the ring to exert a circumferentially-uniform radial spring pressure under working conditions, and from time to time gaging the radial pressure exerted by the ring when confined as under working conditions.

11. The method of making metal packing rings, which exert a predetermined circumferentially-uniform radial spring pressure under working conditions, said method consisting in hammering one of the curved sides of an annulus so as to alter the diameter of the annulus substantially without altering the cross-section and with blows which are heaviest at the middle of the ring and become milder in both directions therefrom and are further varied to compensate for irregularities in the metal, so as to produce a permanent circumferentially-varied distortion of the structure of the metal at the side hammered of a character to cause the ring to exert a circumferentially-uniform radial spring pressure under working conditions.

12. The method of making metal packing rings which consists in hammering one of the circumferences of an annulus so as to alter the diameter of the annulus substantially without altering the cross-section and with blows which are heaviest at the middle and become milder in both directions therefrom, the hammering being so conducted that the several blows produce transverse-strip-like densification areas in the hammered circumference.

13. The method of making metal packing rings, which consists in producing a split annulus, and causing the annulus to spring from its original diameter with a circumferentially-uniform radial force by producing, by hammering one of the curved sides of the annulus substantially without altering the cross-section thereof, a permanent distortion of the structure of the metal at this side, circumferential in direction and varied in degree from maximum at the region opposite the split to minimum toward the ends.

14. The method of making metal packing rings, which consists in producing a split annulus, and causing the annulus to spring open with a circumferentially-uniform radial force by producing, by hammering the inner curved side of the annulus without altering the cross-section thereof, a permanent distortion of the structure of the metal at this side, circumferential in direction and varied in degree from maximum at the region opposite the split to minimum toward the ends.

15. The method of producing metal packing rings which exert substantially-equal radial spring pressure at all points under working conditions, which consists in hammering one of the circumferences of a blank of substantially-uniform cross-section with blows, which, regarding them as progressing from the middle in each direction toward the split portion of the blank, decrease in force, at first gradually, then more rapidly, and gradually again toward the split.

16. The method of producing metal packing rings which exert substantially-equal radial spring pressure at all points under working conditions, which consists in compacting the metal at one of the circumferences of a blank of substantially-uniform cross-section, the force exerted on the circumference of the ring being greatest at the portion opposite the split and decreasing in both directions toward the split, at first gradually, then more rapidly, and gradually again toward the split.

In testimony whereof, I have signed my name to this specification, in the presence of two subscribing witnesses.

ROBERT B. WASSON.

Witnesses:
  J. J. KOZINN,
  D. HAROLD BUSH.